United States Patent [19]

Anderson et al.

[11] Patent Number: 5,210,014

[45] Date of Patent: * May 11, 1993

[54] MID-GREEN SENSITIZING DYES FOR PHOTOGRAPHIC MATERIALS

[75] Inventors: Richard B. Anderson, Fairport; Robert E. Dickerson, Rochester; Steven G. Link, Rochester; Fred M. Macon, Rochester; Wayne W. Weber, II, Honeoye Falls, all of N.Y.

[73] Assignee: Eastman Kodak Company, Rochester, N.Y.

[ * ] Notice: The portion of the term of this patent subsequent to Mar. 23, 2010 has been disclaimed.

[21] Appl. No.: 676,913

[22] Filed: Mar. 28, 1991

[51] Int. Cl.$^5$ ................................................ G03C 1/18
[52] U.S. Cl. ..................................... 430/588; 430/583
[58] Field of Search ......................................... 430/588

[56] References Cited

U.S. PATENT DOCUMENTS

| | | | |
|---|---|---|---|
| 3,348,949 | 10/1967 | Bannert et al. | 430/558 |
| 3,623,883 | 11/1971 | Bannert et al. | 430/558 |
| 3,933,507 | 1/1976 | von Konig et al. | 430/583 |
| 4,425,425 | 1/1984 | Abbott et al. | 430/502 |
| 4,425,426 | 1/1984 | Abbott et al. | 430/502 |
| 4,510,235 | 4/1985 | Ukai et al. | 430/574 |
| 4,801,526 | 1/1989 | Yoshida et al. | 430/567 |
| 4,837,140 | 6/1989 | Ikeda et al. | 430/550 |

FOREIGN PATENT DOCUMENTS 648981 6/1963 Belgium .
1231079 5/1971 United Kingdom .

Primary Examiner—Charles L. Bowers, Jr.
Assistant Examiner—Janet C. Baxter
Attorney, Agent, or Firm—Gordon M. Stewart

[57] ABSTRACT

Dyes of formula (I) below are described. The dyes are useful as mid-green sensitizing dyes for photographic materials

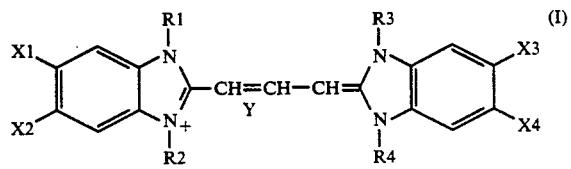

In the above formula, R1 and R3 are methyl or ethyl, at least one of R1 and R3 being methyl. R2 and R4 are substituted or unsubstituted $C_1$ to $C_6$ alkyl, provided that R2 and R4 are not both methyl. X1, X2, X3, and X4 are each independently methyl, methylthio, fluoro-substituted methyl or methylthio, or hydrogen, provided that at least one of X1 and X2 and at least one of X3 and X4 are not hydrogen. Y represents an ion as needed to balance the charge of the molecule. The dyes of formula (I) sensitize silver halide to light in the mid-green region of the spectrum.

18 Claims, No Drawings

MID-GREEN SENSITIZING DYES FOR PHOTOGRAPHIC MATERIALS

CROSS REFERENCE TO RELATED APPLICATIONS

This application is related to concurrently filed, copending, commonly assigned U.S. Ser. No. 07/677,004 Attorney Docket No.58,672 of Dickerson et al., the disclosure of which is incorporated by reference.

FIELD OF THE INVENTION

This invention relates to dyes, and more particularly to their use as mid-green sensitizers for photographic materials.

BACKGROUND OF THE INVENTION

Silver halide photography usually involves the exposure of silver halide with light in order to form a latent image that is developed during photographic processing to form a visible image. Silver halide is intrinsically sensitive only to light in the blue region of the spectrum. Thus, when silver halide is to be exposed to other wavelengths of radiation, such as green or red light in a multicolor element or infrared radiation in an infrared-sensitive element, a spectral sensitizing dye is required. Sensitizing dyes are chromophoric compounds (usually cyanine dye compounds) that are adsorbed to the silver halide. They absorb light or radiation of a particular wavelength and transfer the energy to the silver halide to form the latent image, thus effectively rendering the silver halide sensitive to radiation of a wavelength other than the blue intrinsic sensitivity. Sensitizing dyes can also be used to augment the sensitivity of silver halide in the blue region of the spectrum.

During processing of color photographic materials, the silver halide is removed from the material. With black and white materials, the silver halide that was not exposed is removed. In either case, it is desirable to remove the sensitizing dye as well. Sensitizing dye that is not removed tends to cause retained dye stain, which adversely affects the image recorded in the photographic material. The problem of retained sensitizing dye stain is further aggravated by the increasing use of tabular grain emulsions and high chloride emulsions. Tabular grain emulsions have a high surface area per mole of silver, which can lead to higher levels of sensitizing dye and thus, higher levels of retained dye stain. High chloride emulsions necessitate the use of sensitizing dyes having enhanced adsorption to silver halide, and are also often subjected to rapid processing, which can aggravate dye stain problems.

Most photographic films needing green sensitization require a high degree of sensitivity at the wavelengths of the mid-green region of the spectrum (540–555 nm, the maximum sensitivity range of the human eye) for adequate speed, color separation, and color reproduction. Also, absorbance of light in the mid-green region is important for radiographic elements employing phosphor screens which emit light in this region. Benzimidazolocarbocyanine, oxacarbocyanine, and benzimidazolooxacarbocyanine dyes are all well known classes of spectral sensitizing dyes which absorb light in the green region of the spectrum. Species of these classes of dyes are disclosed in, for example, U.S. Pat. Nos. 4,425,425 and 4,425,426 (Reexamination Certificate 907) of Abott et al., U.S. Pat. No. 4,510,235 of Ukai et al., U.S. Pat. No. 4,801,526 of Yoshida et al., and U.S. Pat. No. 4,837,140 of Ikeda et al.

Benzimidazolocarbocyanine dyes are very efficient at utilizing light energy and their high basicity allows them to be protonated and removed in processes which use acidic solutions, leaving low residual stain. These dyes function best as J-aggregates on the silver halide grain surface. Such benzimidazolocarbocyanine aggregates, however, generally absorb light at 560 to 590 nm, the long green region of the spectrum. As such, it has been heretofore necessary to use a different class of dyes, e.g. the oxacarbocyanines or benzimidazolo-oxacarbocyanines, for sensitization in the mid-green region. These dyes, however, being less basic tend to leave unacceptably high levels of retained dye after processing.

Another feature of many benzimidazolo-carbocyanines is their relatively low oxidation potential which may lead to poor storage stability of the photographic film or paper in which they have been incorporated caused by the oxidative instability of the sensitizing dye. This poor keeping may be manifested as an increase in fog and/or a loss of photographic speed with storage or incubation of the photographic material.

It is thus an object of the invention to provide sensitizing dyes that aggregate and sensitize efficiently in the 540 to 555 nm region of the spectrum and that leave very low levels of residual dye stain in photographic elements after processing. A further object of the invention is to provide such dyes which are also very stable upon storage.

SUMMARY OF THE INVENTION

These and other objects are met in accordance with the present invention which provides benzimidazolocarbocyanine dyes of the following formula I:

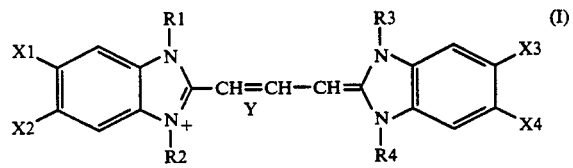

where
- R1 and R3 are methyl or ethyl, at least one of R1 and R3 being methyl;
- R2 and R4 are substituted or unsubstituted $C_1$ to $C_6$ alkyl, provided that R2 and R4 are not both methyl;
- X1, X2, X3, and X4 are each independently methyl, methylthio, fluoro-substituted methyl or methylthio, or hydrogen, provided that at least one of X1 and X2 and at least one of X3 and X4 are not hydrogen; and
- Y represents an ion as needed to balance the charge of the molecule.

The dyes of formula I are effective sensitizers for silver halide photographic materials. They form J-aggregates in the 540–555 nm region of the spectrum, and photographic materials comprising silver halide sensitized with such dyes exhibit low dye stain compared to other classes of sensitizing dyes.

DESCRIPTION OF PREFERRED EMBODIMENTS

In formula I above, R2 and R4 are defined as substituted or unsubstituted $C_1$ to $C_6$ alkyl. Examples of unsubstituted R2 and R4 include lower alkyls such as methyl, ethyl, propyl, butyl, pentyl, and hexyl. Examples of substituents include one or more of sulfo, sulfato, carboxyl, fluoro, amides, esters, cyano, substituted or unsubstituted aryls, and other substituents commonly used in photographic sensitizing dyes. Examples of substituted alkyl R2 and R4 include sulfopropyl, sulfobutyl, trifluoroethyl, allyl, 2-butynyl, N,N-dimethylcarbamoylmethyl, methylsulfonyl-carbamoylmethyl, sulfoethylcarbamoylmethyl, cyanoethyl, cyanomethyl, ethoxycarbonylmethyl, etc.

X1 through X4 are each methyl, methylthio, fluoro-substituted methyl or methylthio, or hydrogen. Examples of fluoro-substituted methyl and methylthio are fluoromethyl, difluoromethyl, trifluoromethyl, fluoromethylthio, difluoromethylthio, and trifluoromethylthio.

Depending upon substituents R2 and R4, a counter ion Y may be necessary to balance the charge of the dye molecule. For example, if the dye molecule is substituted with two anionic substituents (e.g., sulfo), then Y will be a cation. If the dye molecule is substituted with only one anionic substituent, the counterion Y is not present. If the dye molecule is substituted with no anionic substituents, Y will be an anion. Such counter ions are well known in the art and examples thereof include cations such as sodium, potassium, triethylammonium, and the like, and anions such as chloride, bromide, iodide, p-toluene sulfonate, methane sulfonate, methyl sulfate, ethyl sulfate, perchlorate, fluoroborate, and the like.

Examples of compounds according to formula I include the dyes of Table I below.

TABLE I

| Dye | R1 | R2 | R3 | R4 | X1 | X2 | X3 | X4 |
|---|---|---|---|---|---|---|---|---|
| I-1 | Me | SP⁻ | Me | SP⁻ | H | SMe | H | SMe |
| I-2 | Me | Et | Me | Et | H | SMe | H | SMe |
| I-3 | Me | Me | Me | SP⁻ | Me | Me | H | $CF_3$ |
| I-4 | Et | SP⁻ | Me | Et | H | $CF_3$ | Me | Me |
| I-5 | Et | SP⁻ | Me | Me | H | $CF_3$ | H | Me |
| I-6 | Me | Et | Me | SP⁻ | H | SMe | H | $CF_3$ |
| I-7 | Me | SP⁻ | Me | Et | H | $CF_3$ | H | $CF_3$ |
| I-8 | Et | Et | Me | SP⁻ | H | $CF_3$ | H | $CF_3$ |
| I-9 | Me | TFE | Me | SP⁻ | H | $CF_3$ | H | $CF_3$ |
| I-10 | Me | SP⁻ | Me | SP⁻ | H | $CF_3$ | H | $CF_3$ |
| I-11 | Et | TFE | Me | SP⁻ | H | $CF_3$ | H | $CF_3$ |
| I-12 | Me | TFE | Me | TFE | H | $CF_3$ | H | $CF_3$ |
| I-13 | Me | Et | Me | Et | SMe | $CF_3$ | SMe | $CF_3$ |
| I-14 | Me | $CH_2COOMe$ | Me | SP⁻ | H | $CF_3$ | H | $CF_3$ |
| I-15 | Et | $CH_2COOMe$ | Me | Sp⁻ | H | $CF_3$ | H | $CF_3$ |
| I-16 | Me | $CH_2COOMe$ | Et | SP⁻ | H | $CF_3$ | H | $CF_3$ |
| I-17 | Et | $CH_2CONH_2$ | Me | SP⁻ | H | $CF_3$ | H | $CF_3$ |
| I-18 | Et | $CH_2COOEt$ | Me | SP⁻ | H | $CF_3$ | H | $CF_3$ |
| I-19 | Et | $CH_2COOPr$ | Me | SP⁻ | H | $CF_3$ | H | $CF_3$ |
| I-20 | Et | $CH_2CONMe_2$ | Me | SP⁻ | H | $CF_3$ | H | $CF_3$ |
| I-21 | Me | SECM⁻ | Me | TFE | SMe | $CF_3$ | SMe | $CF_3$ |
| I-22 | Me | TFE | Et | TFE | Me | $CF_3$ | Me | $CF_3$ |
| I-23 | Me | $CH_2CN$ | Et | SP⁻ | H | $CF_3$ | H | $CF_3$ |
| I-24 | Me | Et | Me | Et | $CF_3$ | $CF_3$ | $CF_3$ | $CF_3$ |
| I-25 | Me | TFE | Me | $CH_2COOMe$ | Me | $CF_3$ | Me | $CF_3$ |
| I-26 | Me | SECM⁻ | Me | Et | H | $CF_3$ | H | $CF_3$ |
| I-27 | Me | TFE | Me | 4SB⁻ | H | $CF_3$ | H | $CF_3$ |
| I-28 | Me | TFE | Me | 3SB⁻ | H | $CF_3$ | H | $CF_3$ |
| I-29 | Me | TFE | Me | SE⁻ | H | $CF_3$ | H | $CF_3$ |
| I-30 | Me | TFE | Me | MSCM⁻ | H | $CF_3$ | H | $CF_3$ |

Me - Methyl
Et - Ethyl
TFE - Trifluoroethyl
SE⁻ - Sulfoethyl
SP⁻ - Sulfopropyl
MSCM⁻ - Methylsulfonylcarbamoylmethyl
SECM⁻ - Sulfoethylcarbamoylmethyl
SMe - Methylthio
3SB⁻ - 3-sulfobutyl
4SB⁻ - 4-sulfobutyl Dye I-1 has a potassium counterion Y, dyes I-2, I-13, I-22 and I-24 have p-toluene sulfonate counterions Y, dye I-10 has a sodium counterion Y, dye I-12 has a fluoroborate counterion Y, and dye I-25 has a bromide counterion Y associated therewith. The particular counterion is not critical, however, and others may be selected, for example, from those listed above.

In a preferred embodiment, the combination of substituents R1-R4 and X1-X4 are selected to fit the following equation (i):

$$0.455\Sigma\sigma_i(R1-R4)+0.144\Sigma\sigma_p(X1-X4)+0.610\geq 0.68 \qquad (i)$$

where the small sigmas are electronic substituent constants, $\sigma_i$ being Taft's sigma(inductive) constant, and $\sigma_p$ being Hammett's sigma(para) constant. It has been found that dyes with an oxidation potential greater than or equal to 0.68 are more stable toward speed loss in a stored photographic element. Equation (i) is a quantitative expression for the oxidation potential of a benzimidazolocarbocyanine dye based on its chemical structure. Values for the above constants and a discussion of their meaning can be found in Hansch and Leo, *Substituent Constants for Correlation Analysis in Chemistry and Biology*, John & Sons, New York 1979, the disclosure of which is incorporated by reference. As shown in examples 2 and 3 below, when substituents R1 through R4 and X1 through X4 are chosen so that the sum of their Taft's sigma(inductive) constants and Hammett's sigma(para) constants fit equation (i), speed loss due to oxidative instability can be avoided.

The dyes of formula I can be prepared according to techniques that are well-known in the art, such as described in Hamer, *Cyanine Dyes and Related Compounds*, 1964 and James, *The Theory of the Photograhic Process* 4th, 1977.

The amount of sensitizing dye that is useful in the invention is preferably in the range of 0.1 to 1.0 millimoles per mole of silver halide and more preferably from 0.2 to 0.7 millimoles per mole of silver halide. Optimum dye concentrations will depend on the intended end use of the photographic material and can be determined by methods known in the art.

The silver halide used in the practice of the invention can be of any known type, such as silver bromoiodide, silver bromide, silver chloride, silver chlorobromide, and the like.

The type of silver halide grain used in the invention is not critical and essentially any type of silver halide grains can be used in the practice of the invention. Since the dyes of the invention are low in retained dye stain, they may advantageously be used in combination with tabular grain emulsions, which have a greater surface area, allowing for greater amounts of dye to be used, which can aggravate dye stain problems Tabular silver halide grains are grains having two substantially parallel crystal faces that are larger than any other crystal face on the grain. Tabular grain emulsions preferably have at least 50% of the grain population accounted for by tabular grains that satisfy the formula $AR/t > 25$. In this formula, AR stands for aspect ratio, which equals $D/t$. D is the diameter of the grain in micrometers and t is the thickness of the grain between the two substantially parallel crystal faces in micrometers. The grain diameter D is determined by taking the surface area of one of the substantially parallel crystal faces, and calculating the diameter of a circle having an area equivalent to that of the crystal face. The grain size of the silver halide may have any distribution known to be useful in photographic compositions, and may be either polydisperse or monodisperse.

The silver halide grains to be used in the invention may be prepared according to methods known in the art, such as those described in *Research Disclosure*, Item 308119, December, 1989 [hereinafter referred to as *Research Disclosure I*]and James, *The Theory of the Photographic Process*. These include methods such as ammoniacal emulsion making, neutral or acid emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation.

The silver halide to be used in the invention may be advantageously subjected to chemical sensitization with compounds such as gold sensitizers (e.g., aurous sulfide) and others known in the art. Compounds and techniques useful for chemical sensitization of silver halide are known in the art and described in *Research Disclosure I* and the references cited therein.

The silver halide may be sensitized by the dye of formula I by any method known in the art, such as described in *Research Disclosure I*. The dye may be added to an emulsion of the silver halide grains and a hydrophilic colloid at any time prior to (e.g., during or after chemical sensitization) or simultaneous with the coating of the emulsion on a photographic element. The dye/silver halide emulsion may be mixed with a dispersion of color image-forming coupler immediately before coating or in advance of coating (e.g., 2 hours).

The above-described sensitizing dyes can be used alone, or may be used in combination with other sensitizing dyes, e.g. to also provide the silver halide with sensitivity to wavelengths of light outside the mid-green region or to supersensitize the silver halide.

In a preferred embodiment of the invention, the sensitizing dyes of the invention are used to sensitize silver halide in photographic emulsions, which can be coated as layers on photographic elements. Essentially any type of emulsion (e.g., negative-working emulsions such as surface-sensitive emulsions of unfogged internal latent image-forming emulsions, direct-positive emulsions such as surface fogged emulsions, or others described in, for example, *Research Disclosure I*) may be used.

Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in *Research Disclosure I*. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in *Research Disclosure I*. The vehicle can be present in the emulsion in any amount known to be useful in photographic emulsions.

The emulsion can also include any of the addenda known to be useful in photographic emulsions. These include chemical sensitizers, such as active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 5 to 8, and temperatures of from 30 to 80° C., as illustrated in *Research Disclosure*, June 1975, item 13452 and U.S. Pat. No. 3,772,031.

Other addenda include antifoggants, stabilizers, filter dyes, light absorbing or reflecting pigments, vehicle hardeners such as gelatin hardeners, coating aids, dye-forming couplers, and development modifiers such as development inhibitor releasing couplers, timed development inhibitor releasing couplers, and bleach accelerators. These addenda and methods of their inclusion in emulsion and other photographic layers are well-known in the art and are disclosed in *Research Disclosure I* and the references cited therein.

The emulsion may also include brighteners, such as stilbene brighteners. Such brighteners are well-known in the art and are used to counteract dye stain, although the dyes of formula I generally have minimal dye stain even if no brightener is used.

The emulsion layer containing silver halide sensitized with the dye of formula I can be coated simultaneously or sequentially with other emulsion layers, subbing layers, filter dye layers, interlayers, or overcoat layers, all of which may contain various addenda know to be included in photographic elements. These include antifoggants, oxidized developer scavengers, DIR couplers, antistatic agents, optical brighteners, light-absorbing or light-scattering pigments, and the like.

The layers of the photographic element can be coated onto a support using techniques well-known in the art. These techniques include immersion or dip coating, roller coating, reverse roll coating, air knife coating, doctor blade coating, stretch-flow coating, and curtain coating, to name a few. The coated layers of the element may be chill-set or dried, or both. Drying may be accelerated by known techniques such as conduction, convection, radiation heating, or a combination thereof.

Photographic elements comprising the composition of the invention can be black and white or color. A color photographic element generally contains three silver emulsion layers or sets of layers: a blue-sensitive layer having a yellow dye-forming color coupler associated therewith; a green-sensitive layer having a magenta dye-forming color coupler associated therewith; and a red-sensitive layer having a cyan dye-forming color coupler associated therewith. Dye-forming couplers are well-known in the art and are disclosed, for example, in *Research Disclosure I*.

Photographic elements comprising the composition of the invention can be processed in any of a number of well-known photographic processes utilizing any of a number of well-known processing compositions, described, for example, in *Research Disclosure I*, or in James, *The Theory of the Photographic Process* 4th, 1977.

The invention is described further in the following synthesis and photographic examples.

Synthesis of Dye I-12 a) 1,2-Dimethyl-5-trifluoromethylbenzimidazole (5.35 g, 0.025 mole) and 2,2,2-trifluoroethyl trifluoromethanesulfonate (6.5 mL, 0.044 mole) were combined in 20 mL of toluene. The mixture was heated at 05° C. for 27 hours. The product, 1,2-dimethyl-3-(2,2,2-trifluoroethyl)-5-trifluoromethylbenzimidazolium trifluoromethanesulfonate, separated as an oil which crystallized upon cooling. The yield was 9.9 g, 0.022 mole, 89%.

b) 1,2-Dimethyl-3-(2,2,2-trifluoroethyl)-5-trifluoromethylbenzimidazolium trifluoromethanesulfonate (4.02 g, 0.009 mole) was dissolved in 15 mL of dimethylformamide. Diethoxymethyl acetate (1.1 mL, 0.0067 mole) and 1,8-diazabicyclo[5.4.0]undec-7-ene (1.0 mL, 0.0067 mole) were added and the mixture was heated to reflux for 10 minutes. Excess sodium fluoroborate in methanol solution was added to the cooled reaction mixture to precipitate dye I-12. The yield was 2.1 g, 0.0030 mole, 67%. The dye could be recrystallized from a mixture of ethanol and acetonitrile. Lambda max (methanol): 492 nm. Extinction coefficient: 169,000 L/mole-cm.

Analysis:
Calculated for $C_{25}H_{19}BF_{16}N_4$: 43.5%C, 2.8%H, 8.1%N
Found: 43.4%C, 2.7%H, 8.0%N Synthesis of Dye I-17

3-Carbamoylmethyl-1-ethyl-2-methyl-5-trifluoromethylbenzimidazolium chloride (1.61 g, 0.005 mole) and anhydro-2-acetanilidovinyl-1-methyl-3-(3-sulfopropyl)-5-trifluoromethylbenzimidazolium hydroxide (2.40 g, 0.005 mole) were suspended in 35 mL of acetonitrile. 1,8-Diazabicyclo[5.4.0]undec-7-ene (0.80 mL, 0.0054 mole) was added and the mixture was heated to reflux over 15 minutes. Reflux was maintained for 25 minutes and dye separated from the reaction mixture. After cooling the solid dye I-17 was collected. The yield was 1.95 g, 0.0031 mole, 62%. Lambda max (methanol): 497 nm. Extinction coefficient: 165,000 L/mole-cm.

Analysis:
Calculated for $C_{27}H_{27}F_6N_5O_4S$: 51.4%C, 4.3%H, 11.1%N
Found: 51 1%C, 4.3%H, 11.2%N Photographic Example 1

Photographic elements were prepared by coating on a support a silver halide emulsion layer containing chemically sensitized 0.2 μm cubic silver bromoiodide (2.6 mole% I) at 10.8 mg Ag/dm$^2$, hardened gelatin at 73 mg/dm$^2$, and sensitizing dye as indicated below at 0.6 millimole dye per mole of Ag. The elements were given a wedge spectral exposure and processed with Kodak RP X-Omat processing. The sensitometric data is presented in Table II below.

In Table II, "Aggregation Peak" is the wavelength of maximum light absorption by the adsorbed dye in the emulsion coating. "Absorptance" refers to the percent of light absorbed at the wavelength of maximum light absorption by the dye in the coating. "Speed" is defined as the speed at lambda max (in log E units multiplied by 100) minus the intrinsic speed of the dyed emulsion at 400 nm (in log E units multiplied by 100) plus 200. This measurement of speed allows for comparison of the spectral sensitivity provided by the dyes while using a uniform chemical sensitization that is not optimized for each sensitizing dye. "Stain" was measured by placing the processed film in front of a scanning spectrophotometer. The total transmission (T) against an undyed reference was measured between 400 nm and 900 nm. The data was plotted as absorbance ($-\log 1/T$). The stain was then calculated as the maximum absorbance at any wavelength in this range.

In addition to dyes of formula (I) according to the invention, comparison dyes A through G illustrated below were also evaluated.

TABLE II

| Dye | Aggregation Peak | Absorptance | Speed | Stain |
|---|---|---|---|---|
| I-1 | 545 | 29.4 | 177 | 0.0 |
| I-2 | 547 | 37.6 | 209 | 0.0 |
| I-3 | 553 | 53.3 | 266 | 0.0 |
| I-4 | 549 | 51 | 247 | 0.0 |
| I-5 | 556 | 43.2 | 262 | 0.0 |
| I-6 | 545 | 49.4 | 196 | 0.0 |
| I-7 | 545 | 57.0 | 261 | <0.01 |
| I-8 | 551 | 58.0 | 249 | <0.01 |
| I-9 | 542 | 56.1 | 258 | 0.01 |
| I-10 | 542 | 49.0 | 246 | 0.01 |
| I-11 | 546 | 66.5 | 250 | 0.015 |
| I-14 | 544 | 57.0 | 258 | <0.01 |
| I-15 | 548 | 54.9 | 257 | <0.01 |
| I-16 | 546 | 53.2 | 257 | <0.01 |
| I-17 | 555 | 55.3 | 256 | <0.01 |
| I-18 | 554 | 54.0 | 263 | 0.015 |
| I-19 | 554 | 51.6 | 261 | 0.015 |
| I-20 | 549 | 62.2 | 243 | <0.01 |
| I-27 | 543 | 65.0 | 252 | 0.01 |
| I-28 | 542 | 65.3 | 248 | 0.01 |
| I-29 | 542 | 64.8 | 243 | 0.02 |
| I-30 | 545 | 65.1 | 253 | 0.03 |
| A | 492* | 15.2 | — | 0.0 |
| B | 571 | 52.3 | 250 | 0.0 |
| C | 431* | 26.4 | 201 | 0.01 |

TABLE II-continued

| Dye | Aggregation Peak | Absorptance | Speed | Stain |
|---|---|---|---|---|
| D | 562 | 58 | 237 | 0.01 |
| E | 544 | 26 | 245 | 0.07 |
| F | 545 | 30 | 236 | 0.04 |
| G | 514 | 18 | 156 | 0.02 |

*These dyes did not form J-aggregates

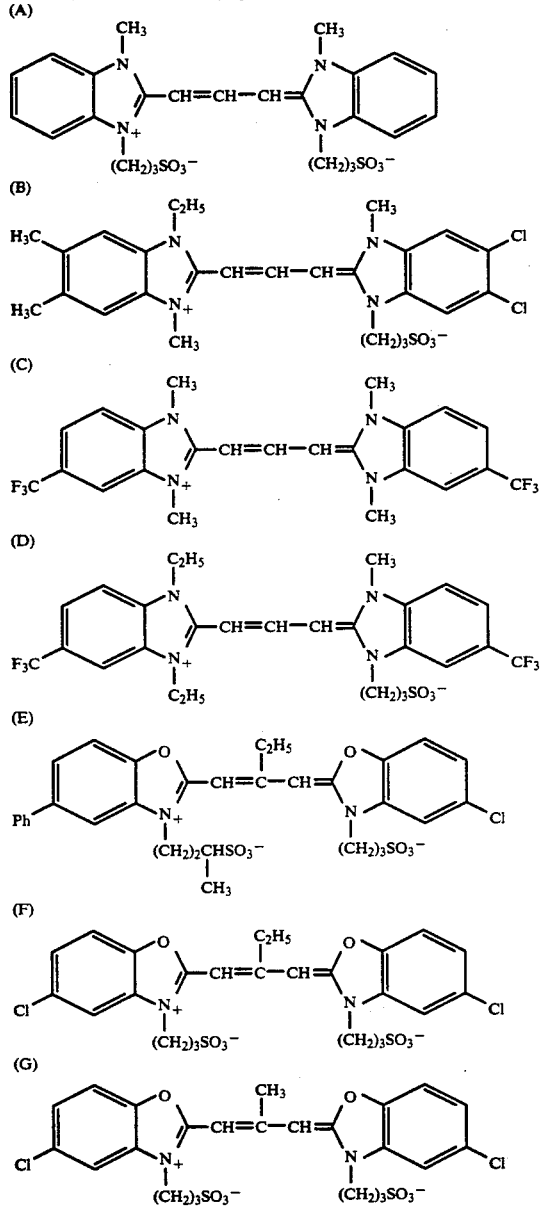

The above data demonstrates that the benzimidazolocarbocyanine dyes of the invention (dyes of formula (I)) aggregate in the mid-green region and have low post-process stain. Comparison dye A, in which all X1-X4 are hydrogen, did not aggregate and was a poor sensitizer. Comparison dye B, in which X3 and X4 are Cl, formed an aggregate which absorbed at too long a wavelength, outside the mid-green region. Comparison dye C, in which all R1-R4 are methyl, did not form an aggregate in the mid green region. Comparison dye D, in which both R1 and R3 are ethyl, formed an aggregate which absorbed at too long a wavelength, outside the mid-green region. Comparison dyes E, F, and G are oxacarbocyanines and exhibited greater stain. Dye G also was a poor sensitizer. Only the dyes of the invention formed aggregates which absorbed in the mid-green region and exhibited minimal dye stain.

Photographic Example 2

A silver bromide tabular grain emulsion (1.7 microns equivalent circular diameter by 0.13 micron) chemically sensitized with 3.5 mg potassium tetrachloroaurate, 0.45 mg potassium selenocyanate, 3.4 mg sodium thiosulfate, and 20 mg sodium thiocyanate per mole of silver was dyed with either 0.5 or 0.75 mmoles dye/mole silver. Dyes I-4 and I-11 of Table I above and comparison dyes H and J (illustrated below) were evaluated. Tetraazaindene (2.1 g/mole Ag) was also added as an antifoggant. The emulsion was coated on Estar poly(ethylene terephthalate) support at a level of 390 mg gel and 200 mg silver per square foot with 1% bisvinylsulfonylmethyl ether hardener and 1% saponin as a spreading agent. Strips were given a 1/50"wedge spectral exposure and processed in a Kodak RP X-OMAT process. Photographic speed was measured at a density of 0.3 above Dmin. One set of strips were incubated for one week at 49° C., 50% Relative Humidity, and processed again to compare fog growth. The following results were obtained (Table III).

TABLE III

| Dye | mmole/mole Ag | Speed | Sens. Peak | Fog (Init.) | Fog (After 1 wk. inc.) | Equation (i) value |
|---|---|---|---|---|---|---|
| H | 0.5 | 224 | 570 | 0.11 | 0.55 | 0.514 |
|   | 0.75 | 235 | 570 | 0.16 | 0.95 |  |
| J | 0.5 | 213 | 570 | 0.14 | 0.23 | 0.523 |
|   | 0.75 | 232 | 570 | 0.16 | 0.37 |  |
| I-4 | 0.5 | 231 | 550 | 0.09 | 0.14 | 0.530 |
|   | 0.75 | 239 | 550 | 0.08 | 0.22 |  |
| I-11 | 0.5 | 282 | 550 | 0.05 | 0.06 | 0.743 |
|   | 0.75 | 284 | 550 | 0.08 | 0.07 |  |

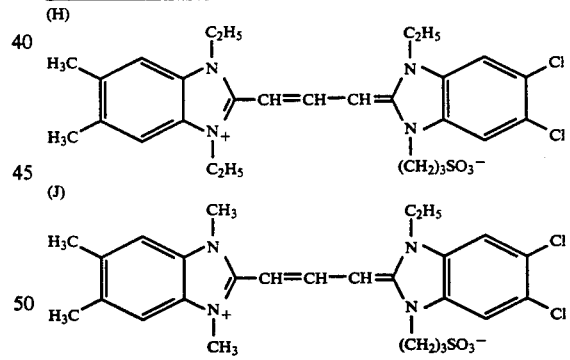

Equation (i) values were calculated using the $\sigma_i$ values for Me (−0.04), Et (−0.05), TFE (+0.14), SP− (−0.1), 3SB− (−0.1) and allyl (0); and $\sigma_p$ values for Me (−0.17), Cl (+0.23), H (0), CF$_3$ (+0.54), and SMe (0).

The dyes which had values of less than 0.68 from equation (i) showed substantial fog growth while the dye of the invention having a value greater than 0.68 in accordance with equation (i) not only sensitized at 550 nm, but showed no fog growth at all.

Photographic Example 3

A series of dyes having varying oxidation potentials were coated on a polymorphic 0.37 μ silver bromoiodide (3.4% iodide) emulsion. The emulsion was dyed at a level of 90 mg dye/mole of silver. Potassium iodide (10 mmole/Ag mole) was added to aid adsorption and bromo-tetraazaindene (275 mg/Ag mole) to control fog. The resulting sensitized emulsions were coated on clear supports with 3228 mg Ag/m², which were divided into three sets of strips. One set of strips was then subjected to 4000 psi of air at 50° C. in an autoclave for 40 hours. Another set was treated simultaneously with 4000 psi of UPc nitrogen. A third set was held as a control. After wedge spectral exposure and Kodak RP X-OMAT processing, the speeds (sensitivity at 0.3 above gross fog) at the dye peak and at 400 nm for the oxygen-treated strips, the control strips and the nitrogen-treated strips were compared. The nitrogen treated strips did not lose any dyed speed. After adjusting the 400 speeds, the loss in speed from the dye peak for the oxygen treated strips relative to the control strips was used as a measure of the stability of the dye. The dye structures with their calculated values from equation (i) and the speed lost in the high pressure air treatment are shown in Table IV below.

TABLE IV

| Dye | R1 | R2 | R3 | R4 | X1 | X2 | X3 | X4 | Eqn. (i) Calc'd Value | Adj. Speed Loss |
|---|---|---|---|---|---|---|---|---|---|---|
| 1 | Et | TFE | Et | TFE | Cl | Cl | Cl | Cl | 0.824 | 10 |
| 2 | Et | Et | Et | Et | Cl | CF₃ | Cl | CF₃ | 0.741 | 23 |
| 3 | Et | Allyl | Et | Allyl | Cl | Cl | Cl | Cl | 0.697 | 28 |
| 4 | Et | SP⁻ | Et | SP⁻ | Cl | CF₃ | Cl | CF₃ | 0.695 | 18 |
| 5 | Et | TFE | Et | TFE | H | H | H | H | 0.692 | 13 |
| 6 | Et | Et | Et | Et | Cl | Cl | Cl | Cl | 0.651 | 87 |
| 7 | Et | 3SB⁻ | Et | 3SB⁻ | Cl | Cl | Cl | Cl | 0.606 | 69 |
| 8 | Et | Et | Et | Et | H | Cl | H | Cl | 0.585 | 98 |
| 9 | Et | Et | Et | Et | H | H | H | H | 0.519 | 190 |
| 10 | Et | Et | Et | Et | H | Me | H | Me | 0.470 | 196 |
| 11 | Et | Et | Et | Et | Me | Me | Me | Me | 0.421 | 181 |

SP⁻ - Sulfopropyl
TFE - Trifluoroethyl
SMe - Methylthio
Me - Methyl
Et - Ethyl
3SB⁻ - 3-Sulfobutyl As the above data indicates, dyes with values from equation (i) which are greater than 0.68 (dyes 1-5) are significantly more stable toward photographic speed loss under oxidative conditions than dyes with values from equation (i) which are less than 0.68 (dyes 6-11).

The invention has been described in detail with particular reference to preferred embodiments thereof, but it will be understood that variations and modifications can be effected within the spirit and scope of the invention.

What is claimed is:

1. A photographic element comprising a support having thereon a silver halide emulsion layer sensitized with a benzimidazolocarbocyanine dye according to the following formula I:

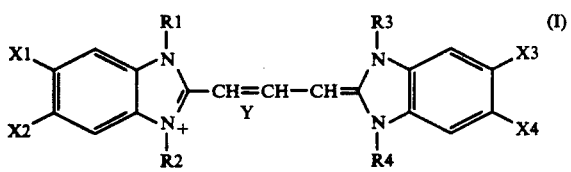

wherein
R1 and R3 are methyl or ethyl, at least one of R1 and R3 being methyl;
R2 and R4 are substituted or unsubstituted $C_1$ to $C_6$ alkyl, provided that R2 and R4 are not both methyl;
X1, X2, X3, and X4 are each independently methyl, methylthio, fluoro-substituted methyl or methylthio, or hydrogen, provided that at least one of X1 and X2 and at least one of X3 and X4 are not hydrogen;
Y represents an ion as needed to balance the charge of the molecule; and wherein the adsorbed dye forms on the emulsion a J-aggregate with a maximum absorption between 540 to 556 nm, and the combination of substituents R1-R4 and X1-X4 are selected to fit the following equation (i);

$$0.455\Sigma\sigma_i(R1-R4)+0.144\Sigma\sigma_p(X1-X4)+0.610>0.68 \quad (i)$$

where the small sigmas are electronic substituent constants, $\sigma_i$ being Taft's sigma (inductive) constant, and $\sigma_p$ being Hammett's sigma(para) constant.

2. A photographic element according to claim 1 wherein R1 and R3 are each methyl.

3. A photographic element according to claim 1 wherein R1 is methyl and R3 is ethyl.

4. A photographic element according to claim 1 wherein at least one of X1, X2, X3 and X4 is trifluoromethyl.

5. A photographic element according to claim 1 wherein at least one of R23 and R4 is sulfoalkyl.

6. A photographic element according to claim 1 wherein at least one of R 2 and R4 is a fluoro-substituted alkyl.

7. A photographic element according o claim 6 wherein at least one of R23 and R4 is trifluoroethyl.

8. A photographic element according to claim 1 wherein both X2 and X4 are not hydrogen.

9. A photographic element according to claim 2 wherein both X2 and X4 are not hydrogen.

10. A photographic element according to claim 3 wherein both X2 and X4 are not hydrogen.

11. A photographic element according to claim 4 wherein both X2 and X4 are not hydrogen.

12. A photographic element according to claim 5 wherein both X2 and X4 are not hydrogen.

13. A photographic element according to claim 6 wherein both X2 and X4 are not hydrogen.

14. A photographic element according to claim 7 wherein both X2 and X4 are not hydrogen.

15. A photographic element according to claim 1 wherein at least one of R2 and R4 is a fluoro-substituted alkyl and X2and X4 ar both trifluoromethyl.

16. A photographic element according to claim 15 wherein X1 and X3 are both hydrogen.

17. A photographic element according to claim 1 wherein at least one of R2 and R4 is trifluoroethyl and X2 and X4 are both trifluoromethyl.

18. A photographic element according to claim 17 wherein X1 and X3 are both hydrogen.

* * * * *

UNITED STATES PATENT AND TRADEMARK OFFICE
CERTIFICATE OF CORRECTION

Patent No.: 5,210,014

Dated: May 11, 1993

Inventors: R.B. Anderson et al

It is certified that error appears in the above-identified patent and that said Letters Patent is hereby corrected as shown below:

In Column 12, line 39, delete "R23" and insert --R2--.

In Column 12, line 43, delete "o claim 6" and insert --to claim 6--.

In Column 12, line 44, delete "R23" and insert --R2--.

In Column 12, line 61, delete "X2and X4 ar" and insert --X2 and X4 are--.

Signed and Sealed this

Fifteenth Day of March, 1994

Attest:

BRUCE LEHMAN

Attesting Officer          Commissioner of Patents and Trademarks

UNITED STATES PATENT AND TRADEMARK OFFICE
CERTIFICATE OF CORRECTION

PATENT NO. : 5,211,014
DATED : May 18, 1993
INVENTOR(S) : Walter Kropp

It is certified that error appears in the above-identified patent and that said Letters Patent is hereby corrected as shown below:

Column 1, line 68, after "actuated" insert --.--.

Column 6, line 10, after "control" insert --pressure--.

Signed and Sealed this

Nineteenth Day of April, 1994

Attest:

BRUCE LEHMAN

Attesting Officer     *Commissioner of Patents and Trademarks*